United States Patent
Takahama

(10) Patent No.: US 12,370,973 B2
(45) Date of Patent: Jul. 29, 2025

(54) LOCKING TOOL

(71) Applicant: NIPPON KAYAKU KABUSHIKI KAISHA, Tokyo (JP)

(72) Inventor: Kazuki Takahama, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/844,440

(22) PCT Filed: Mar. 7, 2023

(86) PCT No.: PCT/JP2023/008688
§ 371 (c)(1),
(2) Date: Sep. 6, 2024

(87) PCT Pub. No.: WO2023/181924
PCT Pub. Date: Sep. 28, 2023

(65) Prior Publication Data
US 2025/0187559 A1    Jun. 12, 2025

(30) Foreign Application Priority Data

Mar. 25, 2022    (JP) ................................ 2022-050937

(51) Int. Cl.
*B60R 21/2338*    (2011.01)
(52) U.S. Cl.
CPC .............. *B60R 21/2338* (2013.01); *B60R 2021/23384* (2013.01); *B60R 2021/23388* (2013.01)
(58) Field of Classification Search
CPC ...... B60R 21/2338; B60R 2021/23384; B60R 2021/23388
See application file for complete search history.

(56) References Cited

U.S. PATENT DOCUMENTS 7,240,917 B2 *  7/2007  Fogle, Jr. .............. B60R 21/276
                                               280/739
7,374,205 B2 *  5/2008  Thomas .............. B60R 21/2171
                                               280/743.2
(Continued)

FOREIGN PATENT DOCUMENTS

GB    2412094 A  *  9/2005  ............. B60R 21/16
JP    2002-211348 A    7/2002
(Continued)

OTHER PUBLICATIONS

WO-2014106567-A1 (machine translation) (Year: 2014).*
(Continued)

*Primary Examiner* — Jason D Shanske
*Assistant Examiner* — Joselynn Y Sliteris
(74) *Attorney, Agent, or Firm* — Oblon, McClelland, Maier & Neustadt, L.L.P.

(57) ABSTRACT

A locking tool includes an igniter, a cup-shaped member, a holder and a weak portion. The cup-shaped member includes a cylindrical portion fitted into a tip portion of the igniter, a bottom portion positioned on a side of the tip portion of the igniter, and an actuation pin that is formed outside the bottom portion and configured to lock an object. The holder holds the igniter and the cup-shaped member. The weak portion is formed at a position facing an outer peripheral portion of the actuation pin inside the bottom portion of the cup-shaped member.

4 Claims, 2 Drawing Sheets

(56) References Cited

U.S. PATENT DOCUMENTS

| | | | | |
|---|---|---|---|---|
| 7,419,184 B2* | 9/2008 | Green | ................... | B60R 21/231 |
| | | | | 280/736 |
| 7,438,313 B2* | 10/2008 | Bilbrey | ............... | B60R 21/2644 |
| | | | | 280/737 |
| 7,762,584 B2* | 7/2010 | Morita | ................... | B60R 21/239 |
| | | | | 280/739 |
| 7,938,444 B2* | 5/2011 | Williams | ............ | B60R 21/2338 |
| | | | | 280/739 |
| 8,015,906 B2* | 9/2011 | Ito | ........................ | B60R 21/239 |
| | | | | 280/739 |
| 8,191,925 B2* | 6/2012 | Williams | ............ | B60R 21/2338 |
| | | | | 280/739 |
| 8,353,525 B2* | 1/2013 | Parks | ................... | B60R 21/2338 |
| | | | | 280/743.2 |
| 8,408,584 B2* | 4/2013 | Paxton | ................ | B60R 21/2338 |
| | | | | 280/743.2 |
| 8,408,585 B2* | 4/2013 | Paxton | ................ | B60R 21/2338 |
| | | | | 280/743.2 |
| 8,500,166 B2* | 8/2013 | Inuzuka | ................ | B60R 21/239 |
| | | | | 280/743.2 |
| 10,752,200 B2* | 8/2020 | Ishiguro | ................ | B60R 21/203 |
| 11,007,970 B2* | 5/2021 | Hiraiwa | ................ | B60R 21/203 |
| 11,865,997 B2* | 1/2024 | Kawamura | ......... | B60R 21/2035 |
| 2004/0046376 A1 | 3/2004 | Ryan | | |
| 2009/0236837 A1 | 9/2009 | Fukawatase et al. | | |
| 2009/0301339 A1 | 12/2009 | Ito et al. | | |
| 2009/0302588 A1* | 12/2009 | Schramm | ........... | B60R 21/2338 |
| | | | | 280/743.2 |
| 2021/0300285 A1 | 9/2021 | Zischka | | |

FOREIGN PATENT DOCUMENTS

| | | | | |
|---|---|---|---|---|
| JP | 2004-262427 A | 9/2004 | | |
| JP | 2007-91060 A | 4/2007 | | |
| JP | 2007-315504 A | 12/2007 | | |
| JP | 2007-315533 A | 12/2007 | | |
| JP | 2009-227047 A | 10/2009 | | |
| JP | 2009-293785 A | 12/2009 | | |
| WO | WO-2014106567 A1 * | 7/2014 | ......... | B60R 21/2338 |
| WO | WO-2023181786 A1 * | 9/2023 | ......... | B60R 21/2338 |

OTHER PUBLICATIONS

WO-2023181786-A1 (machine translation) (Year: 2023).*
International Search Report issued on Apr. 25, 2023, in PCT/JP2023/008688 filed on Mar. 7, 2023, 2 pages.

* cited by examiner

LOCKING TOOL

CROSS-REFERENCE TO RELATED APPLICATIONS

The present application is a 35 U.S.C. § 371 national stage application of International patent application PCT/JP2023/008688, filed Mar. 7, 2023, which is based on and claims the benefit of priority to Japanese Application No. 2022-050937, filed Mar. 25, 2022. The entire contents of these applications are incorporated herein by reference.

TECHNICAL FIELD

The present invention relates to a locking tool capable of instantaneously releasing locking by an actuation pin to an object to be locked by instantaneously separating the actuation pin locked to the object to be locked from a housing using an igniter, and particularly relates to a locking tool including a pyrotechnic configured to be suitably used for control and the like at the time of deployment and contraction operation of an automobile airbag and the like.

BACKGROUND ART

Conventionally, an airbag device has been widely used as an example of a safety device for an automobile or the like. In such an airbag device, attempts have been made to control the shape of the airbag and control the hardness (flexibility) of the airbag when the airbag is inflated and deployed in order to increase an impact absorbing force of the airbag on an occupant. The shape control and the hardness control of the airbag are achieved by incorporating various mechanical and electrical elements into the airbag device, and as one of them, one using a locking tool capable of instantaneously releasing a locked state is known.

Here, examples of the locking tool include a locking tool including a squib, a holder that holds the squib, a pin including a locking portion that locks an object to be locked, and a cup that holds the pin, in which the holder and the cup are assembled (see Patent Literature 1 below). Note that the cup includes an opening portion at a bottom portion facing an ignition portion of the squib, the pin includes a flange portion protruding outward at a base of the locking portion, and in the locking tool, the locking portion is inserted from the inside to the outside of the cup through the opening portion, and in this state, the flange portion is held only by the cup.

CITATION LIST

Patent Literature

Patent Literature 1: JP 2007-315533 A

SUMMARY OF INVENTION

Technical Problems

In Patent Literature 1 described above, it is possible to provide a locking tool including a pyrotechnic which is excellent in responsiveness and can be easily and inexpensively manufactured. However, in recent years, it is desired to further reduce the size and the number of parts of such a locking tool.

Therefore, an object of the present invention is to provide a locking tool capable of reducing the size or the number of parts as compared with the related art.

Solutions to Problems (1) The locking tool of the present invention includes: an igniter; a cup-shaped member including a cylindrical portion fitted into a tip portion of the igniter, a bottom portion of the cylindrical portion provided on a side of the tip portion of the igniter, and an actuation pin that is formed outside the bottom portion and locks an object to be locked; and a holder that holds the igniter and the cup-shaped member, in which a weak portion is formed at a position facing an outer peripheral portion of the actuation pin inside the bottom portion of the cup-shaped member.

(2) In the locking tool of (1) described above, the weak portion is preferably an annular recess.

(3) In the locking tool of (1) or (2) described above, preferably, a flange portion is provided at an end portion of the cup-shaped member on a side opposite to a side of the bottom portion, and the flange portion and the igniter are both fixed to the holder by caulking a caulking portion provided at an end portion of the holder on a side of the igniter from an outside of the flange portion.

According to the configurations (1) to (3) described above, it is possible to provide a locking tool capable of reducing the size and the number of parts as compared with the related art. Note that, by reducing the number of parts, the cost can be reduced as compared with the related art. Furthermore, at the time of activation, an end portion of the actuation pin on the side of the igniter can be made less likely to be caught by the object to be locked, and the object to be locked can be smoothly detached from the actuation pin.

DESCRIPTION OF EMBODIMENT

Hereinafter, a locking tool according to an embodiment of the present invention will be described with reference to the drawings.

Figure 1:
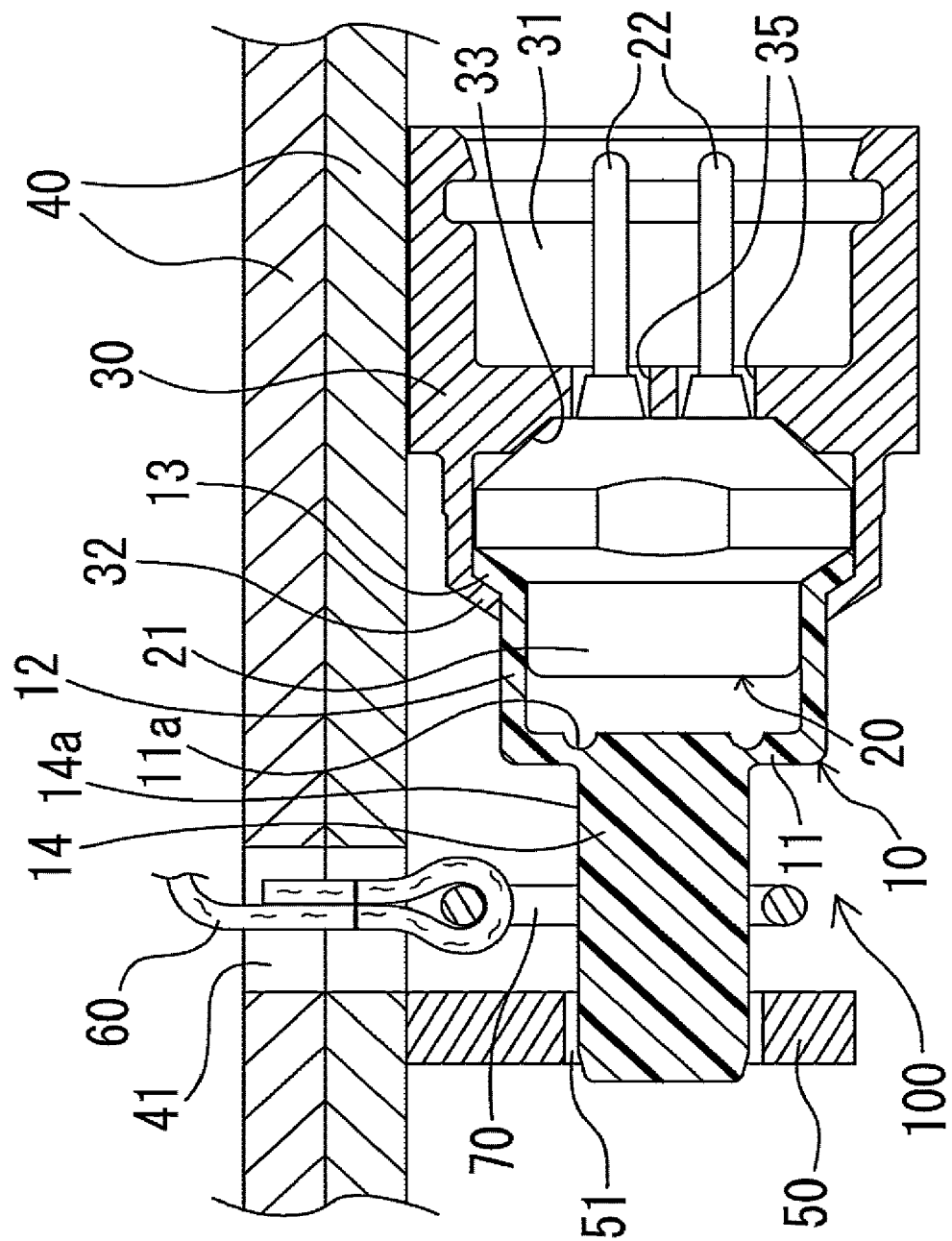
FIG. 1 is a cross-sectional view illustrating a locking tool according to a first embodiment of the present invention.

As illustrated in FIG. 1, the locking tool 100 of the present embodiment includes a cylindrical member 10, an igniter 20 including a portion fitted into the cylindrical member 10, and a holder 30 that holds (locks) the cylindrical member 10 and the igniter 20 and is fixed to a part of a bag holder 40. Note that the bag holder 40 is a case that accommodates and holds an airbag and a gas generator (not illustrated), and includes a hole portion 41. The hole portion 41 is provided so that an airbag mooring member 60 (for example, a member called a tether or the like) used for adjustment of inflation of the airbag and a ring-shaped member 70 (an object to be locked) provided at a tip portion of the airbag mooring member 60 can pass therethrough.

The cylindrical member 10 is a bottomed cylindrical member including an opening portion provided at an end portion on a side of the igniter 20, and is a component in which a bottom portion 11, a cylindrical portion 12, a flange portion 13, and an actuation pin 14 are integrally molded.

The bottom portion 11 is provided with a weak portion 11a that is an annular recess at a position facing an outer peripheral portion 14a of the actuation pin 14 to be described later on an inner surface (on a side of the igniter 20). The weak portion 11a is broken by a pressure wave received at the time of activation of the igniter 20. Note that the weak portion 11a may be anything as long as the weak portion is broken by the pressure wave received at the time of activation of the igniter 20. That is, the recess may not be a continuous annular recess, and a discontinuous recess may be formed in an annular shape.

The actuation pin 14 is a columnar member including the outer peripheral portion 14a, and is integrally provided on an outer portion of the bottom portion 11. Furthermore, in the state (initial state) of FIG. 1 where the locking tool 100 is fixed to the bag holder 40, the actuation pin 14 locks the airbag mooring member 60 via the ring-shaped member 70, and a tip portion of the actuation pin 14 is inserted into a hole 51 formed in a support piece portion 50 provided in the bag holder 40. Note that instead of using the ring-shaped member 70, an annular portion (not illustrated) may be formed by annularly forming a tip portion of the airbag mooring member 60, and the annular portion may be locked by the actuation pin 14 as an object to be locked.

The igniter 20 includes a cap member 21 that covers an ignition portion (not illustrated), and a pair of terminal pins 22 that is connected to the ignition portion and to which a predetermined amount of current is supplied. The igniter 20 is activated when a collision is detected by a collision detection means (not illustrated) provided in a vehicle when the vehicle collides, and the ignition portion is energized from a control unit provided in the vehicle via the terminal pins 22 based on the detection.

Furthermore, the igniter 20 is fixed in a state where the pair of terminal pins 22 is inserted into a pair of hole portions 35 formed in a substantially central portion of the holder 30 in a state where a central axis of the igniter 20 and a central axis of the holder 30 substantially coincide with each other.

The holder 30 has a substantially cylindrical shape, and is a metal integrally molded product including a female connector portion 31, an end portion 32, and a hole portion 33. Note that the end portion 32 has a substantially cylindrical shape before the flange portion 13 is caulked and fixed, and is pressed and deformed at the time of caulking and fixing.

Figure 2:
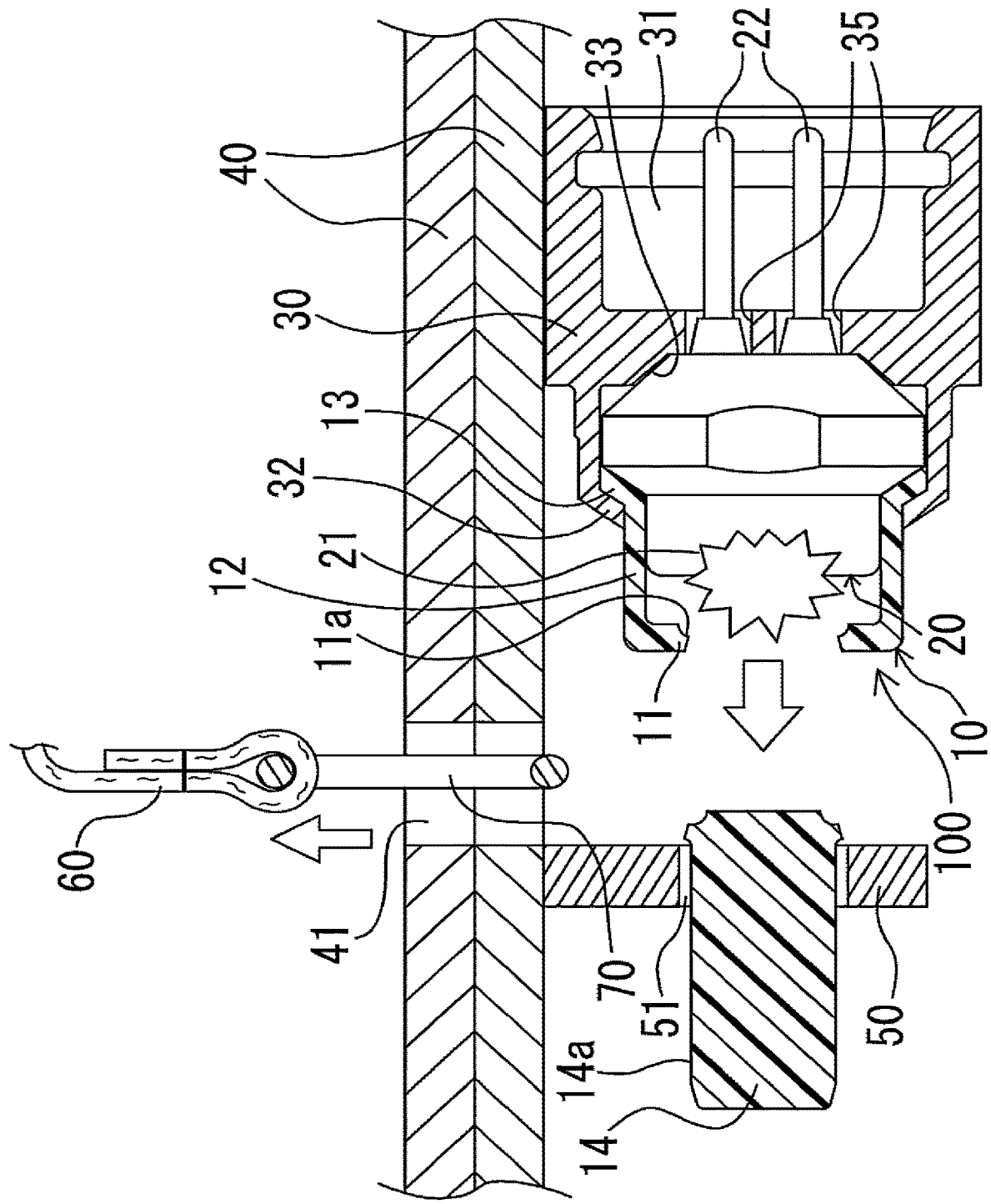
FIG. 2 is a cross-sectional view illustrating the locking tool in FIG. 1 after operation.

In the locking tool 100 having the above-described configuration, in a case where the igniter 20 is activated, the bottom portion 11 receives a pressure wave generated from the igniter 20, so that the weak portion 11a breaks and the actuation pin 14 moves to a side of the support piece portion 50 (see FIG. 2). At this time, the locking of the ring-shaped member 70 and the airbag mooring member 60 is released (see FIG. 2). Then, the tip portions of the ring-shaped member 70 and the airbag mooring member 60 pass through the hole portion 41 of the bag holder 40, and the airbag (not illustrated) is released from the mooring by the airbag mooring member 60.

According to the present embodiment, since the actuation pin 14 is integrally molded with the cylindrical member 10, it is possible to provide the locking tool 100 capable of reducing the size and the number of parts as compared with the related art. Note that, by reducing the number of parts, the manufacturing cost can be reduced as compared with the related art.

Furthermore, according to the present embodiment, since a portion to be caulked is only the end portion 32 of the holder 30, the size can be further reduced, and the manufacturing is easier than the related art. Therefore, the manufacturing cost can be further reduced.

Furthermore, since the annular weak portion 11a is provided at a position facing the outer peripheral portion 14a of the actuation pin 14, in a case where the weak portion 11a breaks after the actuation, a diameter of the end portion of the actuation pin 14 on the side of the igniter 20 is substantially the same as a diameter of the outer peripheral portion 14a. As a result, when the actuation pin 14 moves toward the support piece portion 50, the end portion of the actuation pin 14 on the side of the igniter 20 is less likely to be caught by the ring-shaped member 70. Therefore, at the time of activation of the locking tool 100, the ring-shaped member 70 is smoothly detached from the actuation pin 14.

Although the embodiment of the present invention has been described above with reference to the drawings, it should be understood that the specific configuration is not limited to these embodiment. The scope of the present invention is defined not by the description of the above embodiment but by the claims, and includes meanings equivalent to the claims and all modifications within the scope.

Here, the locking tool 100 of the above embodiment is used for locking and releasing the airbag mooring member 60 via the ring-shaped member 70, but the present invention is not limited thereto. For example, it can also be used as a locking tool that pushes a predetermined part (target object) in a fixing and opening device (selectable force limiter, load limiter, and the like) attached to one of safety devices such as an automobile called a so-called pretensioner.

REFERENCE SIGNS LIST 10 cylindrical member
11 bottom portion
11a weak portion
12 cylindrical portion
13 flange portion
14 actuation pin
14a outer peripheral portion
20 igniter
21 cap member
22 terminal pin
30 holder
31 female connector portion
32 end portion
33, 35, 41 hole portion
40 bag holder
50 support piece portion
51 hole
60 airbag mooring member
70 ring-shaped member
100 locking tool

The invention claimed is:

1. A locking tool, comprising:
an igniter;
a cup-shaped member including a cylindrical portion fitted into a tip portion of the igniter, a bottom portion positioned on a side of the tip portion of the igniter, and an actuation pin formed outside the bottom portion and configured to lock an object; and
a holder that holds the igniter and the cup-shaped member,
wherein the cup-shaped member has a weak portion formed at a position facing an outer peripheral portion of the actuation pin inside the bottom portion of the cup-shaped member.

2. The locking tool according to claim 1, wherein the weak portion is an annular recess.

3. The locking tool according to claim 2, wherein the cup-shaped member has a flange portion positioned at an end portion of the cup-shaped member on a side opposite to a side of the bottom portion, and the flange portion and the igniter are both fixed to the holder by caulking a caulking portion positioned at an end portion of the holder on a side of the igniter from an outside of the flange portion.

4. The locking tool according to claim 1, wherein the cup-shaped member has a flange portion positioned at an end portion of the cup-shaped member on a side opposite to a side of the bottom portion, and the flange portion and the igniter are both fixed to the holder by caulking a caulking portion positioned at an end portion of the holder on a side of the igniter from an outside of the flange portion.

* * * * *